US012679698B2

(12) United States Patent
Qi et al.

(10) Patent No.: US 12,679,698 B2
(45) Date of Patent: Jul. 14, 2026

(54) METHOD AND APPARATUS FOR DETECTING ELEVATOR SAFETY CHAIN

(71) Applicant: Otis Elevator Company, Farmington, CT (US)

(72) Inventors: Fu Qi, Shanghai (CN); Bichun Li, Shanghai (CN); Shenhong Wang, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 941 days.

(21) Appl. No.: 17/967,175

(22) Filed: Oct. 17, 2022

(65) Prior Publication Data

US 2023/0211979 A1 Jul. 6, 2023

(30) Foreign Application Priority Data

Jan. 4, 2022 (CN) ........................ 202210005863.2

(51) Int. Cl.
*B66B 3/00* (2006.01)
*B66B 13/22* (2006.01)

(52) U.S. Cl.
CPC ................ *B66B 13/22* (2013.01); *B66B 3/00* (2013.01)

(58) Field of Classification Search
CPC ......... B66B 13/22; B66B 3/00; B66B 5/0031; B66B 5/0097; B66B 5/0093
See application file for complete search history.

(56) References Cited

U.S. PATENT DOCUMENTS 6,193,019 B1 * 2/2001 Sirigu ..................... B66B 13/22 187/391
7,708,118 B2 * 5/2010 Tyni ...................... B66B 5/0025 187/391
7,891,467 B2 * 2/2011 Kattainen ............... B66B 13/22 187/394

(Continued)

FOREIGN PATENT DOCUMENTS

CN 1487901 A 4/2004
CN 2626962 Y 7/2004

(Continued)

OTHER PUBLICATIONS

European Search Report for Application No. 22208168.9, Issued May 10, 2023, 9 Pages.

*Primary Examiner* — Rina I Duda
(74) *Attorney, Agent, or Firm* — CANTOR COLBURN LLP

(57) ABSTRACT

A method and device for detecting an elevator safety chain and a computer-readable storage medium for implementing the method. A device for detecting an elevator safety chain, includes: an interface unit coupled with the elevator safety chain and configured to output an operating signal having a first level when the elevator safety chain is in an ON state and an operating signal having a second level when the elevator safety chain is in an OFF state; and a processing unit, including: memory; a microcontroller coupled with the interface unit; and a computer program stored on the memory and running on the microcontroller, the running of the computer program causes: evaluating reliability of the elevator safety chain based on time domain characteristic of the operating signal output by the interface unit.

20 Claims, 9 Drawing Sheets

(56) References Cited

U.S. PATENT DOCUMENTS

| | | | | |
|---|---|---|---|---|
| 8,490,755 | B2 | 7/2013 | Lindberg | |
| 9,586,790 | B2 | 3/2017 | Tyni et al. | |
| 10,947,087 | B2 | 3/2021 | Herkel et al. | |
| 2003/0000777 | A1* | 1/2003 | Lence Barreiro | B66B 13/22 187/391 |
| 2016/0194180 | A1* | 7/2016 | Kubota | B66D 5/08 187/277 |
| 2018/0208432 | A1* | 7/2018 | Yamada | B66B 5/0031 |
| 2020/0062543 | A1* | 2/2020 | Tracey | B66B 13/22 |
| 2020/0098237 | A1* | 3/2020 | Zacchio | B66B 5/0031 |

FOREIGN PATENT DOCUMENTS

| | | | |
|---|---|---|---|
| CN | 102227367 | A | 10/2011 |
| CN | 103003180 | A | 3/2013 |
| CN | 105438942 | A | 3/2016 |
| CN | 108341312 | A | 7/2018 |
| CN | 106586752 | A | 1/2019 |
| CN | 110894038 | A | 3/2020 |
| DE | 202020101512 | U1 | 4/2021 |
| EP | 3617114 | A1 | 3/2020 |
| EP | 3628625 | A1 | 4/2020 |
| EP | 3532421 | B1 | 9/2020 |
| EP | 3484802 | B1 | 3/2021 |

* cited by examiner

METHOD AND APPARATUS FOR DETECTING ELEVATOR SAFETY CHAIN

FOREIGN PRIORITY

This application claims priority to Chinese Patent Application No. 202210005863.2, filed Jan. 4, 2022, and all the benefits accruing therefrom under 35 U.S.C. § 119, the contents of which in its entirety are herein incorporated by reference.

TECHNICAL FIELD

The present application relates to elevator technology, in particular to a method and device for detecting an elevator safety chain and a computer-readable storage medium for implementing the method.

BACKGROUND

An elevator system usually includes multiple door interlocks, each installed on the corresponding landing door and including a landing door switch for detecting the locking state and unlocking state of the door interlock. These landing door switches are connected in series with each other, and an operating signal indicating the closed state of all door switches during elevator operation is sent to an elevator control device to correctly operate an elevator car.

In the daily maintenance of the elevator safety chain, maintenance personnel need to check all landing door switches one by one. The above method requires a lot of manpower and material resources, especially when the elevator system is installed in high-rise buildings.

SUMMARY

According to one aspect of the present application, there is provided a device for detecting an elevator safety chain, comprising:

an interface unit coupled with the elevator safety chain and configured to output an operating signal having a first level when the elevator safety chain is in an ON state and an operating signal having a second level when the elevator safety chain is in an OFF state; and a processing unit, including: memory; a microcontroller coupled with the interface unit; and a computer program stored on the memory and running on the microcontroller, the running of the computer program causes: evaluating reliability of the elevator safety chain based on time domain characteristic of the operating signal output by the interface unit.

Optionally, in the above device, the time domain characteristic includes the characteristic that an amplitude of the operating signal changes with time.

Optionally, in the above device, the running of the computer program causes the reliability of the elevator safety chain to be evaluated in the following manner:

determining a number of times the amplitude of the operating signal output by the interface unit changes within a time window, wherein the time window starts at the time when the amplitude of the operating signal jumps from the first level to the second level or from the second level to the first level;

if the number of changes within the time window is greater than a predetermined first threshold, it is determined that at least one landing door switch in the elevator safety chain has possibility of failure.

Optionally, in the above device, width of the time window is determined based on operation parameters of a landing door.

Optionally, in the above device, the width is determined to be substantially equal to a predetermined duration that the landing door remains open when no passengers are entering an elevator car or a predicted duration that the landing door remains open when a passenger is entering the elevator car.

Optionally, in the above device, the running of the computer program causes the reliability of the elevator safety chain to be evaluated in the following manner:

determining a duration for which the amplitude of the operating signal output by the interface unit is maintained at the first level or the second level;

if the duration is less than a predetermined second threshold, it is determined that at least one landing door switch in the elevator safety chain has possibility of failure.

Optionally, in the above device, the second threshold is determined to be substantially equal to a predetermined duration that the landing door remains open when no passengers are entering an elevator car or a predicted duration that the landing door remains open when a passenger is entering the elevator car.

Optionally, in the above device, the running of the computer program causes the reliability of the elevator safety chain to be evaluated in the following manner:

determining a rate of change of the amplitude of the operating signal output by the interface unit jumping from the first level to the second level or jumping from the second level to the first level;

if the rate of change deviates from a predetermined range, it is determined that at least one landing door switch in the elevator safety chain has a possibility of failure.

Optionally, in the above device, the interface unit includes an AC-DC conversion circuit configured to convert an AC signal transmitted on the elevator safety chain into the operating signal having the first level.

Optionally, in the above device, the interface unit includes a DC-DC conversion circuit configured to convert a DC signal transmitted on the elevator safety chain into the operating signal having the first level.

Optionally, in the above device, the device is an elevator controller.

Optionally, in the above device, the running of the computer program causes an evaluation result on the reliability of the elevator safety chain to be output.

According to another aspect of the present application, there is provided a method for detecting an elevator safety chain, which is characterized in that it comprises the following steps: A. generating a corresponding operating signal based on a state of the elevator safety chain, wherein the operating signal has a first level when the elevator safety chain is in an ON state, and the operating signal has a second level when the elevator safety chain is in an OFF state; and B. evaluating reliability of the elevator safety chain based on time domain characteristic of the generated operating signal.

According to another aspect of the present application, there is provided a computer-readable storage medium having instructions stored in the computer-readable storage medium, when the instructions are executed by a microcontroller, the microcontroller is caused to execute the above method.

DESCRIPTION OF THE DRAWINGS

The above and/or other aspects and advantages of the present application will be more clearly and easily understood from the following description of various aspects in conjunction with the accompanying drawings, in which the same or similar elements are designated by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of this application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units.

Figure 1:
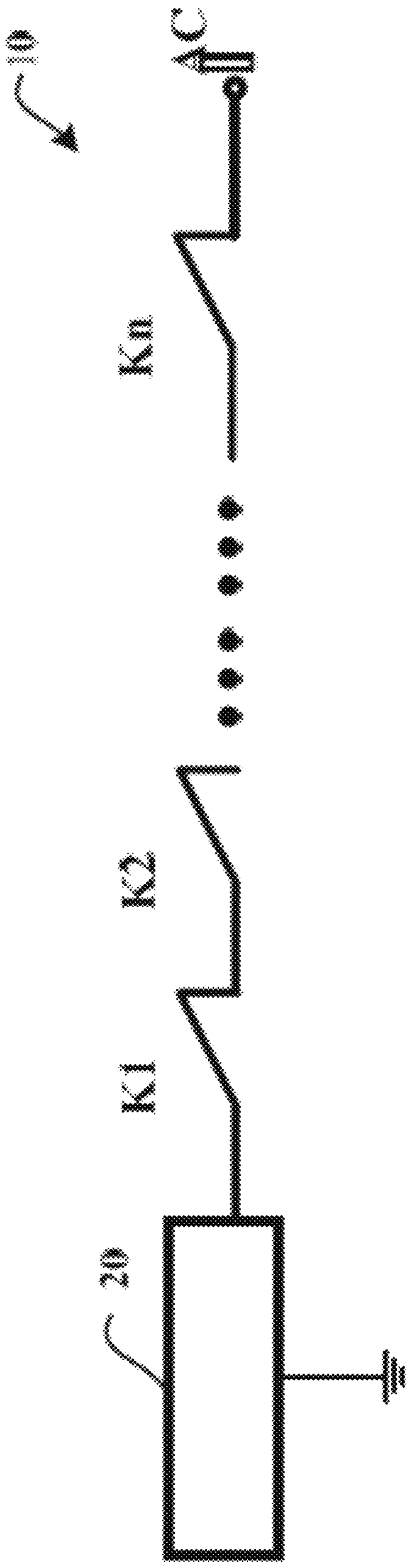
FIG. 1 is a schematic diagram of a typical elevator safety chain.

FIG. 1 is a schematic diagram of a typical elevator safety chain. An elevator safety chain 10 shown in FIG. 1 includes landing door switches k1-kn connected in series with each other, each installed on their respective landing doors. Referring to FIG. 1, the elevator safety chain 10 and a detection device 20 for detecting the elevator safety chain (such as elevator controller or elevator control cabinet) are connected in series between a power supply (such as 110V AC) and a ground. Under normal circumstances, when the landing doors are all closed, the landing door switches k1-kn in the elevator safety chain 10 are all closed. At this time, an operating signal having a first level (such as a high-level signal) will be generated at the detection device 20; on the other hand, when one of the landing doors is opened, the corresponding landing door switch in the elevator safety chain 10 will be in an opened state, and an operating signal having a second level (such as a low-level signal) will be generated at the detection device 20 at this time.

Causes such as dust adhering to contacts, corrosion of the contacts and material aging can cause abnormal operation or misoperation of the landing door switch. For example, when the landing door is closed, the landing door switch that should be in the closed state enters the opened state, or when the landing door is opened, the landing door switch that should be in the opened state enters the closed state.

After research, the inventors of the application found that deterioration of the landing door switch performance is a gradual process over time, that is, in the early stage, the landing door switch only occasionally misoperates, and it will eventually evolve into permanent failure over time.

The inventors of the present application also found that, in terms of time domain characteristic, there is a significant difference between the operating signal generated on the detection device side due to the deterioration of the performance of the landing door switch and the operating signal generated on the detection device side by the landing door switch in response to an elevator control command (or the opening and closing of the landing door). Due to the existence of this difference, the hidden danger of the failure of the landing door switch may be found in time through the detection and analysis of the operating signal, which is particularly conducive to reducing the workload of elevator maintenance.

The difference of the above time domain characteristic is further described below with the help of the accompanying drawings.

Figure 2A:
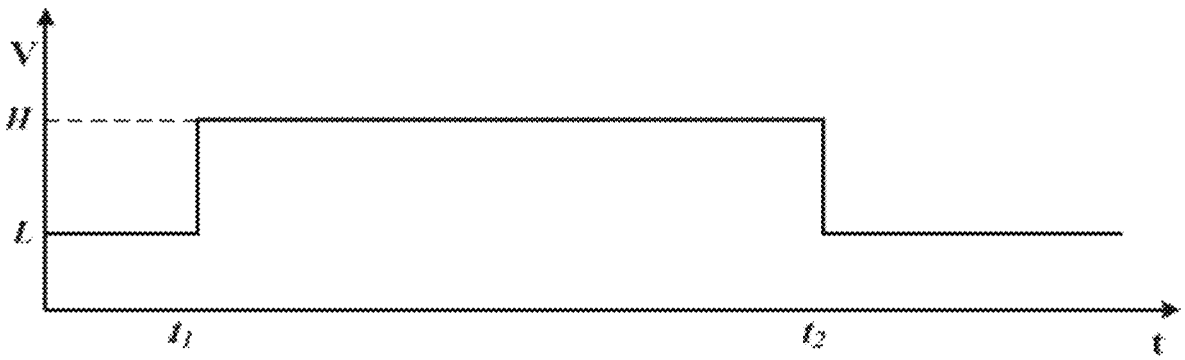
FIGS. 2A-2D show various waveforms of operating signals reflecting states of the elevator safety chain.
Figure 2B:
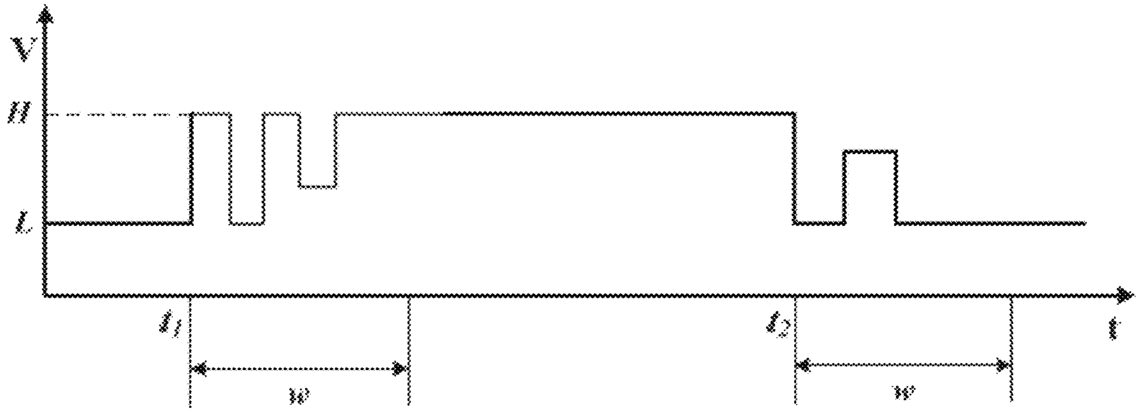
Figure 2C:
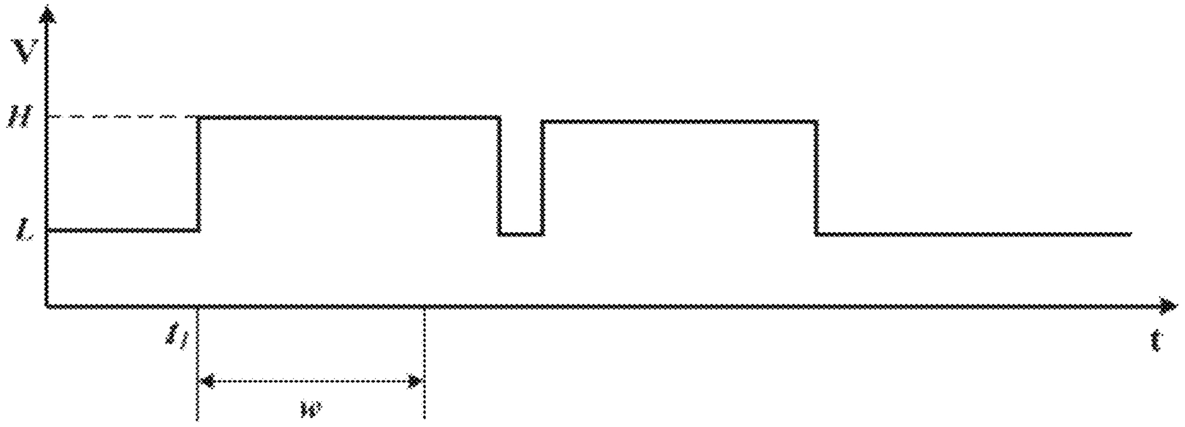

FIGS. 2A-2D show various waveforms of operating signals reflecting states of the elevator safety chain. FIG. 2A is the waveform of the signal generated by the landing door switch on the detection device side in response to the opening and closing of the landing door, and FIGS. 2B-2C are the waveforms of the operating signals caused by the deterioration of the performance of the landing door switch. In the above drawings, the vertical axis represents the amplitude or voltage of the operating signal and the horizontal axis represents the time. For example, but not necessarily, it is assumed that the high-level state of the operating signal corresponds to the state that all landing doors are closed (at this time, all landing door switches in the safety chain are closed), and the low-level state of the operating signal corresponds to the state that a landing door is opened (at this time, the landing door switch associated with the opened landing door in the safety chain is in the opened state).

As shown in FIG. 2A, when each landing door switch in the elevator safety chain has good performance, in response to the operation that the landing door is closed, the elevator safety chain enters the ON state at time $t_1$, and at this time, the operating signal jumps from low level L to high level H; on the other hand, in response to the operation that the landing door is opened, the elevator safety chain enters the opened state at time $t_2$, and at this time, the operating signal jumps from high level H to low level L.

If there is a landing door switch with poor performance in the elevator safety chain, the operating signal will show time domain characteristic different from that shown in FIG. 2A. For example, as shown in FIG. 2B, the operating signal will have one or more amplitude changes within a shorter time window after the transition from low level L to high level H or from high level H to low level L (In FIG. 2A, the time window with $t_1$ as the starting point and width w and the time window with $t_2$ as the starting point and width w). It should be noted that the amplitude of this amplitude change may be equal to the difference between high level H and low level L, but it may also be less than this difference.

In some embodiments of the present application, the signal change caused by the opening and closing of the landing door is distinguished from the signal change caused by the deterioration of the performance of the landing door switch by predetermined the width w of the time window. Optionally, the width of the time window may be determined based on operation parameters of the landing door.

Normally, when an elevator car door is opened, if no passengers enter the car, the elevator car door and landing door will be closed automatically after a predetermined duration (e.g. 5 seconds). In some embodiments of the present application, optionally, the time $t_1$ at which the operating signal jumps from high level H to low level L or from low level L to high level H may be determined as the starting point of the time window, and the width w of the time window may be determined to be substantially equal to a predetermined duration that the landing door remains open when no passengers are entering an elevator car.

Optionally, the width w of the time window may be determined to be substantially equal to a predicted duration that the landing door remains open when a passenger is entering the elevator car. The predicted duration may be determined, for example, based on the operation data of the elevator. For example, the maximum duration recorded in the operation data that the landing door remains open may be determined as the predicted duration, or the duration of the landing door that appears more frequently in the operation data remains open may be determined as the predicted duration.

It should be noted that the setting method of the time window width given above is only exemplary rather than exhaustive. Through the above description, it will be recognized that the operation parameters of the landing door that may be used to reflect the above signal change differences may be used as the basis for setting the time window width.

When the performance of the landing door switch deteriorates, the operating signal may also show the change feature shown in FIG. 2C. Specifically, the amplitude of the operating signal also changes outside the time window shown in FIG. 2C. Compared with the case in which the signal changes in response to the opening and closing of the landing door shown in FIG. 2A, at this time, due to a short change in the amplitude between $t_1$ and $t_2$, the duration $\Delta t_1$ and $\Delta t_2$ for which the operating signal maintains at high level H or low level L becomes shorter.

Figure 2D:
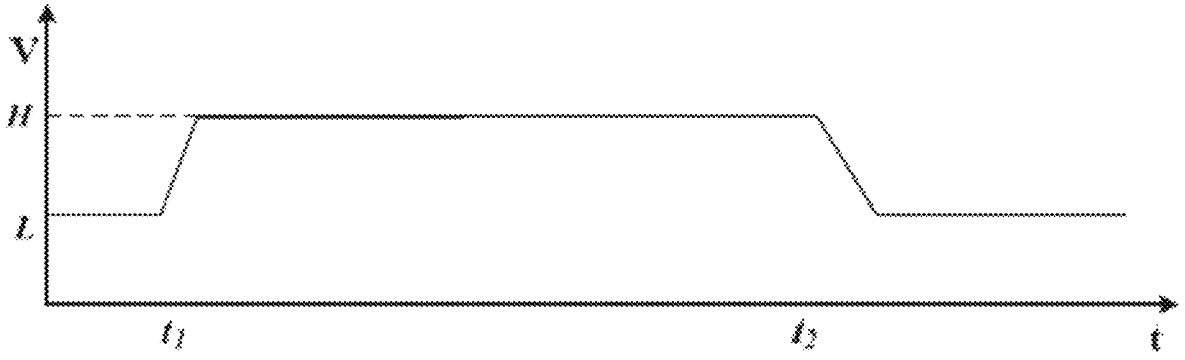

In addition, the deterioration of the performance of the landing door switch may also make the operating signal show the change feature as shown in FIG. 2D. Specifically, at this time, a rate of change of the operating signal decreasing from high level to low level or increasing from low level to high level (for example, the rising edge slope of the signal near $t_1$ and the falling edge slope near $t_2$) is significantly deviated from the situation in response to the opening and closing of the landing door shown in FIG. 2A (i.e., the falling edge slope and the rising edge slope are too fast or too slow).

It should be noted that the differences in time domain characteristic described above are only exemplary rather than exhaustive. Through the above description, it will be recognized that due to the diversity of applications and the working principle of landing door switch, the differences of time domain characteristic will also be reflected in many aspects. These differences may be used to find the potential failure of landing door switch in time.

It should also be noted that various differences in the time domain characteristic described above and not described may be used to judge the failure of landing door switch alone, or may be constructed into various combinations for judging the failure of landing door switch.

Figure 3:
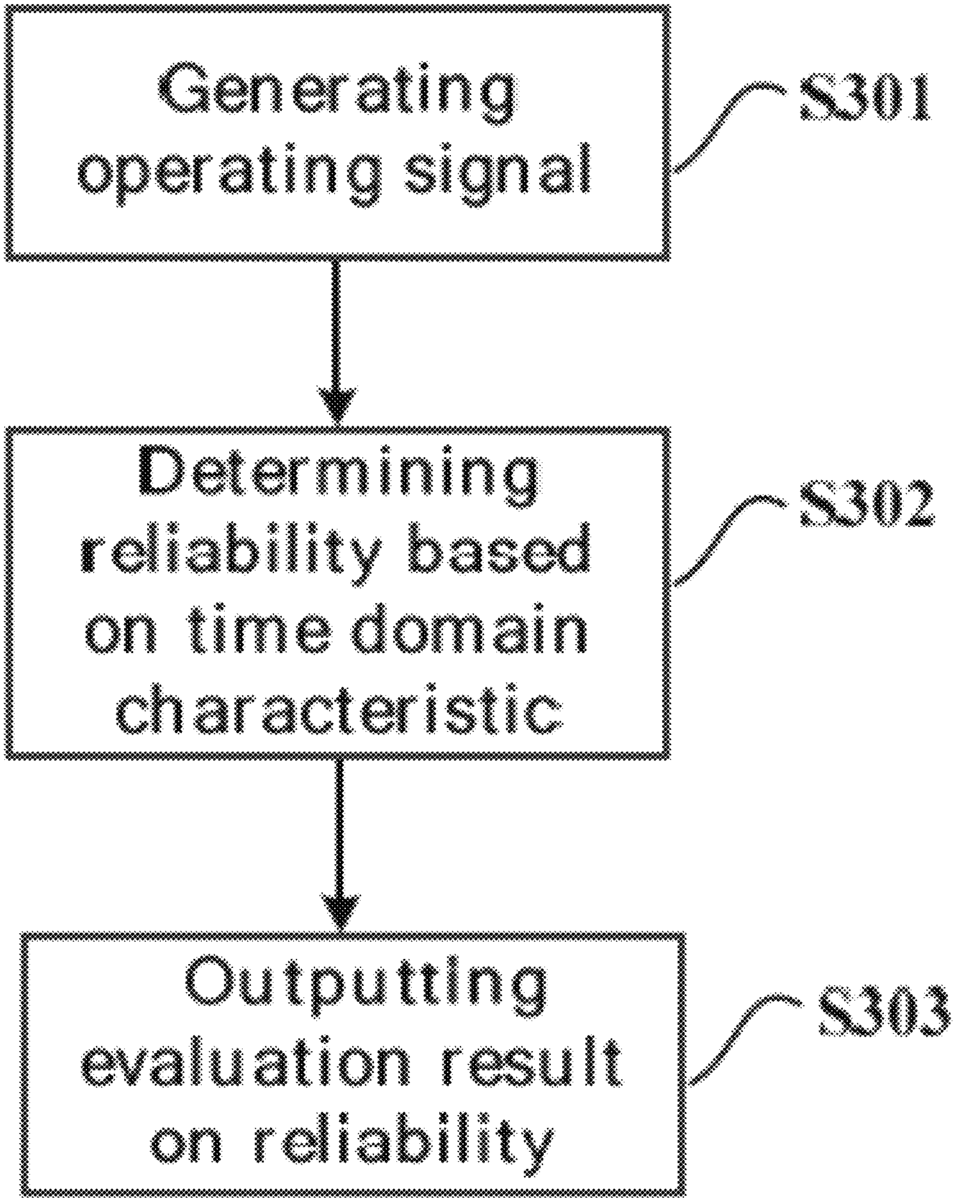
FIG. 3 is a flowchart of a method for detecting an elevator safety chain according to some embodiments of the present application.

FIG. 3 is a flowchart of a method for detecting an elevator safety chain according to some embodiments of the present application. Exemplary, the method shown in FIG. 3 is used for the detection of the elevator safety chain shown in FIG. 1. However, it will be recognized from the following description that the method can also be applied to other types of elevator safety chains (such as safety chains with DC operating current).

The method shown in FIG. 3 includes the following steps:

Step S301: on the side of the detection device (such as the detection device 20 in FIG. 1), a corresponding operating signal is generated based on the state of the elevator safety chain. Exemplary, it is assumed here that the operating signal has a high level when the elevator safety chain is in an ON state and a low level when the elevator safety chain is in an OFF state.

Step S302: the detection device evaluates the reliability of the elevator safety chain based on the time domain characteristic of the generated operating signal.

As described above, in terms of time domain characteristic, there are significant differences in the operating signals in the case of the deterioration of the performance of the landing door switch and in response to the opening and closing of landing door. These differences may be used alone or in combination to evaluate the reliability of elevator safety chain. The specific methods of evaluation will be further described later.

Step S303: the detection device outputs an evaluation result on the reliability of the elevator safety chain. In this step, optionally, the detection device can send the evaluation result to the cloud or terminal device (such as mobile phone).

Figure 4:
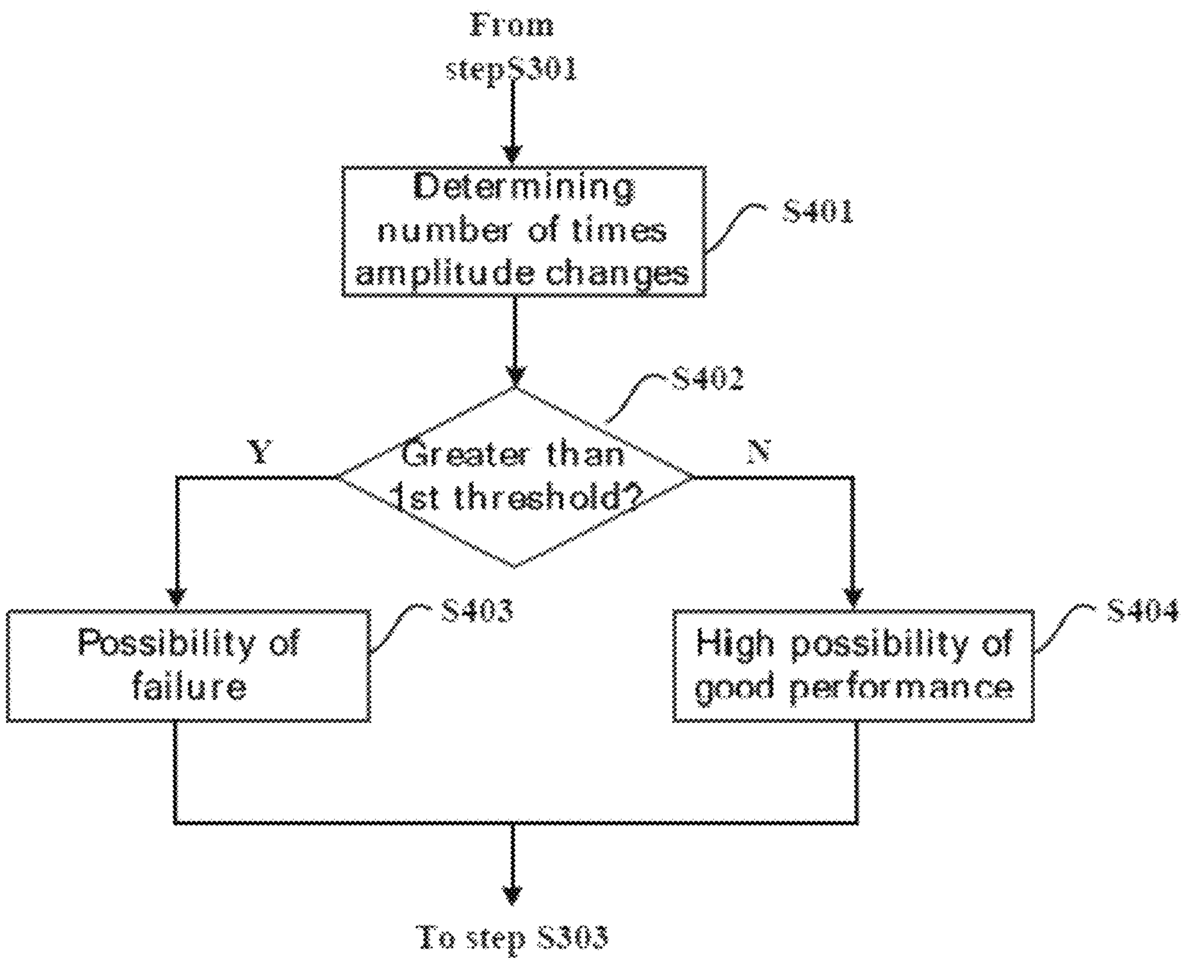
FIG. 4 is a flowchart of a method for evaluating reliability of an elevator safety chain based on differences of time domain characteristic according to other embodiments of the present application.

FIG. 4 is a flowchart of a method for evaluating reliability of an elevator safety chain based on differences of time domain characteristic according to other embodiments of the present application. Exemplary, the method shown in FIG. 4 is used to implement step S302 in FIG. 3.

The method shown in FIG. 4 includes the following steps:

Step S401: the detection device determines the number of times the amplitude of the generated operating signal changes within the time window. Taking the case shown in FIG. 2B as an example, the time t1 when the operating signal jumps from low level L to high level H may be set as the starting point of the time window, and the width w of the time window may be determined based on the operation parameters of the landing door. Optionally, the width w may be determined to be substantially equal to a predetermined duration that the landing door remains open when no passengers are entering an elevator car, or substantially equal to a predicted duration that the landing door remains open when a passenger is entering the elevator car.

Step S402: the detection device determines whether the number of times the amplitude of the operating signal changes within the time window is greater than a predetermined first threshold Th1. If it is greater than the predetermined first threshold Th1, go to step S403, otherwise go to step S404. The first threshold Th1 may be flexibly set according to demands of the application. For example, under the demand of high reliability, the threshold may be set smaller (for example, one), otherwise, it may be set larger.

Step S403: the detection device will generate an evaluation result of the possibility of failure of at least one landing door switch in the elevator safety chain. After step S403, the method flow shown in FIG. 4 will go to step S303 in FIG. 3.

Step S404: the detection device will generate an evaluation result of the high possibility of good performance of the landing door switch in the elevator safety chain. After step S403, the method flow shown in FIG. 4 will also go to step S303 in FIG. 3.

Figure 5:
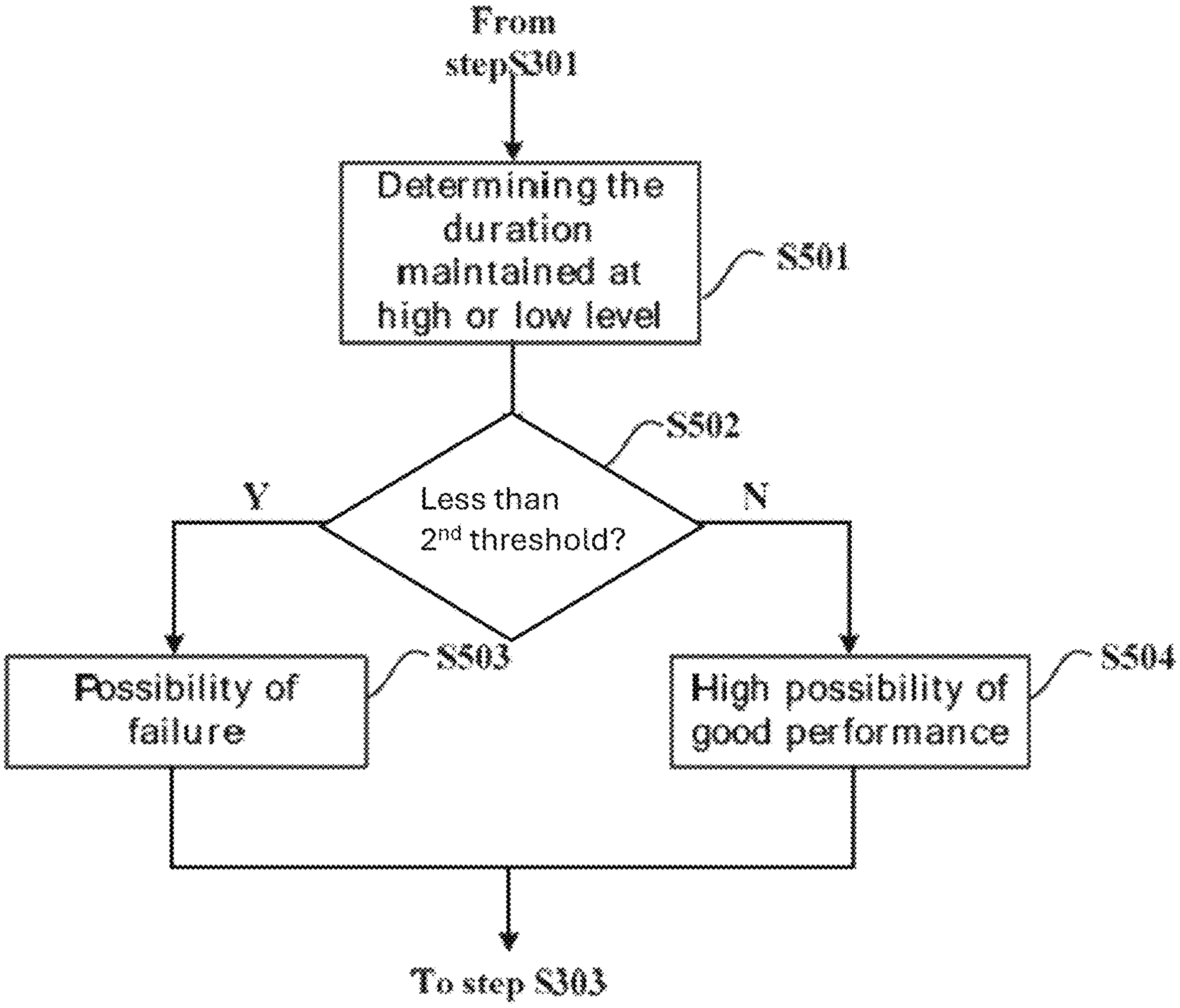
FIG. 5 is a flowchart of a method for evaluating reliability of an elevator safety chain based on differences of time domain characteristic according to other embodiments of the present application.

FIG. 5 is a flowchart of a method for evaluating reliability of an elevator safety chain based on differences of time domain characteristic according to other embodiments of the present application. Exemplary, the method shown in FIG. 5 is also used to implement step S302 in FIG. 3.

The method shown in FIG. 5 includes the following steps:

Step S501: the detection device determines the duration for which the amplitude of the operating signal is maintained at high level H or low level L. Taking the case shown in FIG. 2C as an example, the duration of the operating signal maintaining the high level H from time $t_1$ is $\Delta t_1$, and the duration of the operating signal maintaining the low level L from time $t_2$ is $\Delta t_2$. The above duration may be used for the determination of step S502.

Step S502: the detection device determines whether the duration is less than a predetermined second threshold Th2. If less than the predetermined second threshold Th2, go to step S503, otherwise go to step S504. The second threshold Th2 can also be flexibly set according to demands of the application. For example, under the demand of high reliability, the threshold may be set larger, for example, it is substantially equal to a predetermined duration that the landing door remains open when no passengers are entering an elevator car, or substantially equal to a predicted duration that the landing door remains open when a passenger is entering the elevator car. Otherwise, it may be predetermined smaller.

Step S503: the detection device will generate an evaluation result of the possibility of failure of at least one landing door switch in the elevator safety chain. After step S503, the method flow shown in FIG. 5 will go to step S303 in FIG. 3.

Step S504: the detection device will generate an evaluation result of the high possibility of good performance of the landing door switch in the elevator safety chain. After step S503, the method flow shown in FIG. 5 will also go to step S303 in FIG. 3.

Figure 6:
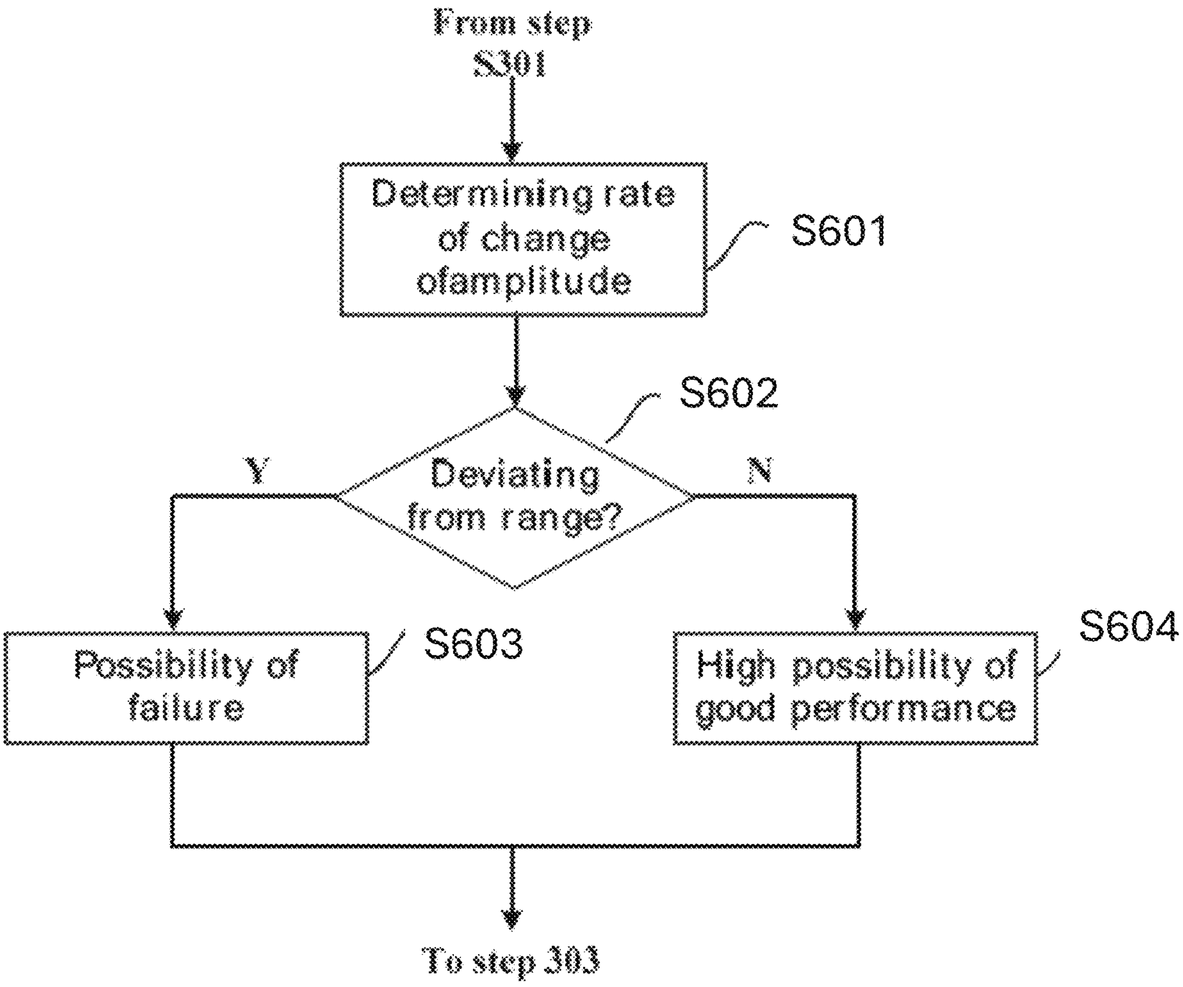
FIG. 6 is a flowchart of a method for evaluating reliability of an elevator safety chain based on differences of time domain characteristic according to other embodiments of the present application.

FIG. 6 is a flowchart of a method for evaluating reliability of an elevator safety chain based on differences of time domain characteristic according to other embodiments of the present application. Exemplary, the method shown in FIG. 6 is also used to implement step S302 in FIG. 3.

The method shown in FIG. 6 includes the following steps:

Step S601: the detection device determines a rate of change of the amplitude of the operating signal from high level H to low level L or from low level L to high level H. Taking the case shown in FIG. 2D as an example, the slope of the rising edge of the operating signal near time $t_1$ or the slope of the falling edge near time $t_2$ may be taken as the rate of change.

Step S602: the detection device determines whether the rate of change of the operating signal determined in step S601 significantly deviates from the rate of change of the operating signal generated in response to the opening and closing of the landing door. If it deviates, proceed to step S603, otherwise proceed to step S604. Optionally, the degree of deviation may be measured within a predetermined range. In one example, the range may be bounded at both ends, that is, the upper and lower limits of the range are finite values. In another example, the predetermined range is bounded at one end. For example, the lower limit of the range is limited (because generally, the rate of change of the operating signal will be reduced after the deterioration of the performance of the landing door switch). Similarly, the range for measuring the degree of deviation may be flexibly set according to demands of the application. For example, under the demand of high reliability, the range may be predetermined smaller, otherwise, it may be predetermined larger.

Step S603: the detection device will generate an evaluation result of the possibility of failure of at least one landing door switch in the elevator safety chain. After step S603, the method flow shown in FIG. 6 will go to step S303 in FIG. 3.

Step S604: the detection device will generate an evaluation result of the high possibility of good performance of the landing door switch in the elevator safety chain. After step S603, the method flow shown in FIG. 6 will also go to step S303 in FIG. 3.

Figure 7:
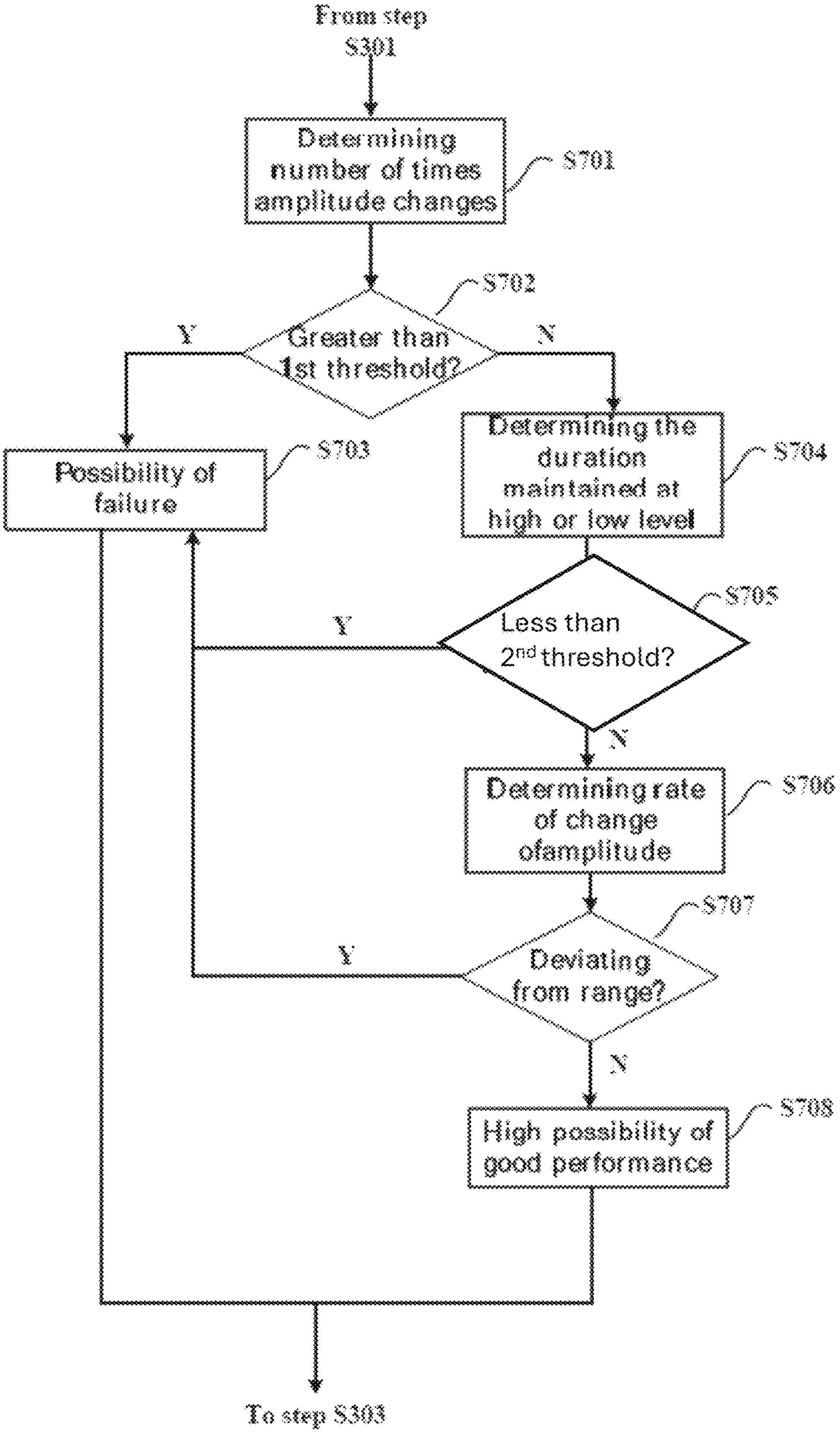
FIG. 7 is a flowchart of a method for evaluating reliability of an elevator safety chain based on differences of time domain characteristic according to other embodiments of the present application.

As described above, various differences in time domain characteristic may be used to judge the reliability of elevator safety chain alone, or may be constructed into various combinations for judging the reliability of elevator safety chain. FIG. 7 is a flowchart of a method for evaluating reliability of an elevator safety chain based on differences of time domain characteristic according to other embodiments of the present application. Different from the embodiments shown in FIGS. 4-6, FIG. 7 judges the reliability of the elevator safety chain based on criteria associated with multiple time domain characteristic differences.

The method shown in FIG. 7 includes the following steps:

S701: the detection device determines the number of times the amplitude of the generated operating signal changes within the time window.

Step S702: the detection device determines whether the number of times the amplitude of the operating signal changes within the time window is greater than a predetermined first threshold Th1 (hereinafter referred to as criterion 1). If it is greater than, go to step S703, otherwise go to step S704.

Step S703: the detection device will generate an evaluation result of the possibility of failure of at least one landing door switch in the elevator safety chain. After step S703, the method flow shown in FIG. 7 will go to step S303 in FIG. 3.

Step S704: the detection device determines the duration for which the amplitude of the operating signal is maintained at high level H or low level L.

Step S705: the detection device determines whether the duration is less than a predetermined second threshold Th2 (hereinafter referred to as criterion 2). If it is less than, go to step S703, otherwise go to step S706.

Step s706: the detection device determines a rate of change of the amplitude of the operating signal from high level H to low level L or from low level L to high level H.

Step S707: the detection device determines whether the rate of change of the operating signal determined in step S706 significantly deviates from the rate of change of the operating signal generated in response to the opening and closing of the landing door (hereinafter referred to as criterion 3). If it deviates, proceed to step S703, otherwise proceed to step S708.

Step S708: the detection device will generate an evaluation result of the high possibility of good performance of the landing door switch in the elevator safety chain. After step S708, the method flow shown in FIG. 7 will also go to step S303 in FIG. 3.

It should be noted that the combination of time domain characteristic differences described in FIG. 7 is only exemplary rather than exhaustive. For example, the number and type of time domain characteristic differences in the combination may be changed, and logical relationship among the criteria may also be different (in the embodiment shown in FIG. 7, the relationship among criteria 1-3 is a logical "or", but it can also be changed to other logical relationships, such as the relationship "and", that is, the judgment of the possibility of failure of the landing door switch may be made only when the three criteria are met at the same time).

Figure 8:
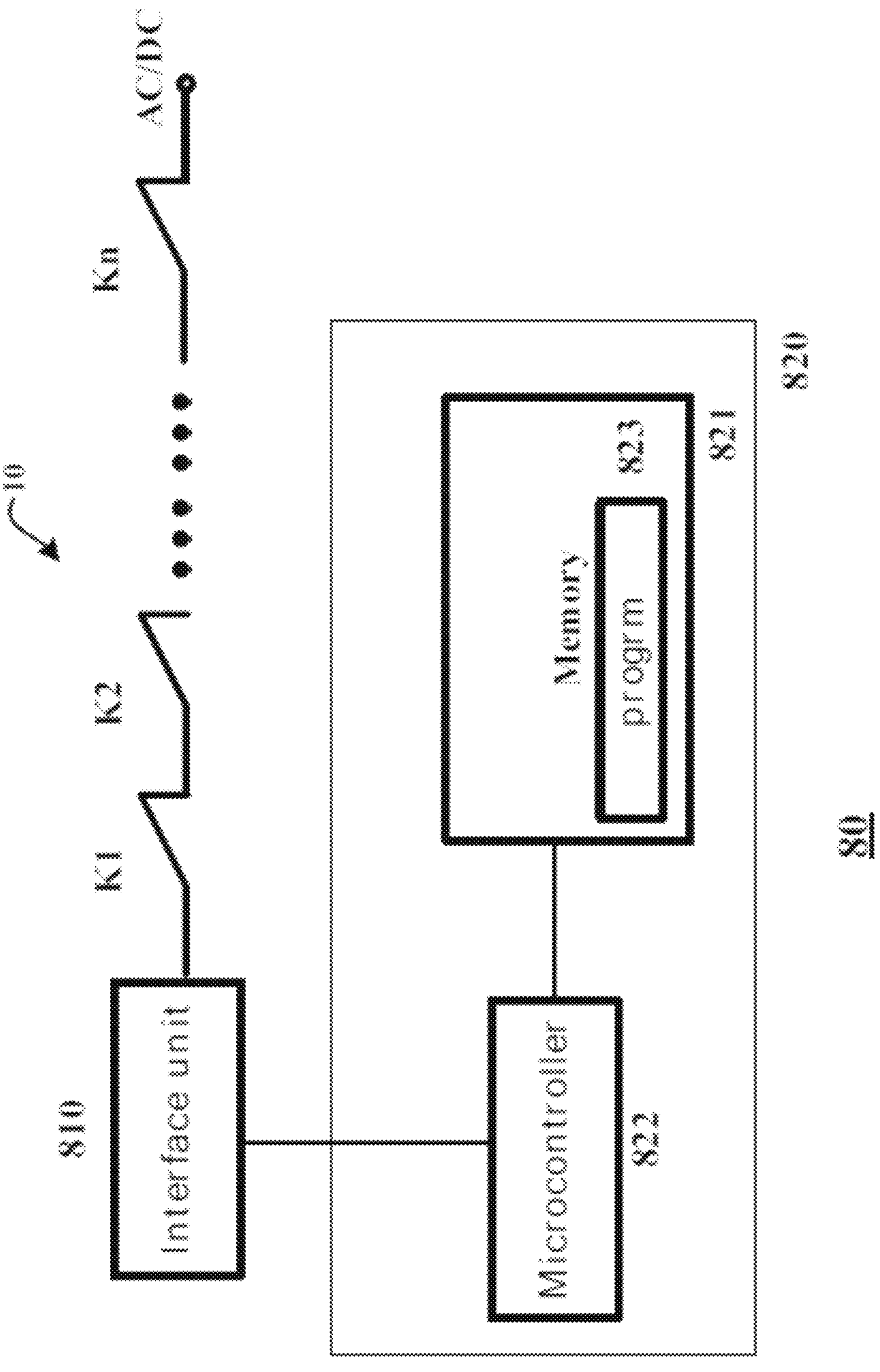
FIG. 8 is a schematic block diagram of a device for detecting an elevator safety chain according to other embodiments of the present application.

FIG. 8 is a schematic block diagram of a device for detecting an elevator safety chain according to other embodiments of the present application. The device may be used, for example, to implement the device 20 in FIG. 1.

As shown in FIG. 8, a device 80 includes an interface unit 810 and a processing unit 820, wherein the processing unit 820 includes a memory 821 (for example, nonvolatile memory such as flash memory, ROM, hard disk drive, magnetic disk, optical disc), a microcontroller 822, and a computer program 823 stored on the memory 821 and operable on the microcontroller 822.

The interface unit 810 in FIG. 8 is coupled with the elevator safety chain (for example, the elevator safety chain 10 in FIG. 1), which is configured to output an operating signal having a first level (for example, high level) to the microcontroller 822 when the elevator safety chain is in an ON state, and an operating signal having a second level (for example, low level) to the microcontroller 822 when the elevator safety chain is in an OFF state.

Exemplary, the interface unit 810 includes an AC-DC conversion circuit (for example, a rectifier bridge), a light emitting diode, and a photoelectric coupling transistor. When the elevator safety chain is in the ON state, the rectifier circuit converts the incoming AC current into DC current, so that the light emitting diode enters light-emitting state, and then generates an amplified signal in the loop where the photoelectric coupling transistor is located, therefore, the operating signal applied at the I/O port of the microcontroller 822 is in the high-level state; on the other hand, when the elevator safety chain is in the open circuit state, the light emitting diode is in the OPEN state, and no signal will be generated in the loop where the photoelectric coupling transistor is located, therefore, the operating signal applied at the I/O port of the microcontroller 822 is in the low-level state.

In the device shown in FIG. 8, the memory 821 stores a computer program 823 executable by the microcontroller 822. The microcontroller 822 is configured to execute the computer program 823 to implement the methods shown in FIGS. 3-7.

It should be noted that although in the example given here, when the elevator safety chain is in the on and OFF state, the operating signals applied at the I/O port of the microcontroller 822 have high level and low level respectively, this arrangement is not necessary. In another example, the operating signals applied at the I/O port of the microcontroller 822 may also have low level and high level when the elevator safety chain is in the on and OFF states, respectively. In addition, the device shown in FIG. 8 may also be applied to the elevator safety chain operating under the DC current by making adaptive changes to the interface unit 810 (for example, replacing the AC-DC conversion circuit with a DC-DC conversion circuit to convert the DC current flowing through the elevator safety chain into an operating signal matching the electrical feature of the I/O port of the microcontroller 822).

According to another aspect of the present application, there is also provided a computer-readable storage medium on which a computer program is stored. When the program is executed by the processor, the method described above with the help of FIGS. 3-7 may be realized.

The computer-readable storage medium referred to in the application includes various types of computer storage media, and may be any available medium that may be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that may be used to carry or store a desired program code unit in the form of instructions or data structures and that may be accessed by a general-purpose or special-purpose computer or a general-purpose or special-purpose processor. Disks as used herein usually copy data magnetically, while discs use lasers to optically copy data. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein may be implemented as electronic hardware, computer software, or combinations of both.

To demonstrate this interchangeability of hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in varying ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and embodiments shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only.

The presented description is not intended to cover every aspect of the application or to limit the application to the precise form disclosed.

What is claimed is:

1. A device for detecting a status of an elevator safety chain, the device comprising:

an interface unit coupled with the elevator safety chain and configured to output an operating signal having a first level when the elevator safety chain is in an ON state and an operating signal having a second level when the elevator safety chain is in an OFF state; and a processing unit, including:

memory;

a microcontroller coupled with the interface unit; and a computer program stored on the memory and running on the microcontroller, the running of the computer program causes: evaluating reliability of the elevator safety chain based on a time domain characteristic of the operating signal output by the interface unit;

wherein evaluating reliability of the elevator safety chain comprises:

determining a number of times the amplitude of the operating signal output by the interface unit changes within a time window, wherein the time window starts at the time when the amplitude of the operating signal jumps from the first level to the second level or from the second level to the first level;

in response to the number of changes within the time window being greater than a predetermined first threshold, determining that at least one landing door switch in the elevator safety chain has possibility of failure.

2. The device according to claim 1, wherein the time domain characteristic includes characteristic on how an amplitude of the operating signal changes with time.

3. The device according to claim 1, wherein a width of the time window is determined based on operation parameters of a landing door.

4. The device according to claim 3, wherein the width is determined to be substantially equal to a predetermined duration that the landing door remains open when no passengers are entering an elevator car or a predicted duration that the landing door remains open when a passenger is entering the elevator car.

5. The device according to claim 2, wherein the running of the computer program causes the reliability of the elevator safety chain to be evaluated in the following manner:

determining a duration for which the amplitude of the operating signal output by the interface unit is maintained at the first level or the second level;

if the duration is less than a predetermined second threshold, it is determined that at least one landing door switch in the elevator safety chain has possibility of failure.

6. The device according to claim 5, wherein the second threshold is determined to be substantially equal to a predetermined duration that the landing door remains open when no passengers are entering an elevator car or a predicted duration that the landing door remains open when a passenger is entering the elevator car.

7. The device according to claim 2, wherein the running of the computer program causes the reliability of the elevator safety chain to be evaluated in the following manner:

determining a rate of change of the amplitude of the operating signal output by the interface unit jumping from the first level to the second level or jumping from the second level to the first level;

if the rate of change deviates from a predetermined range, it is determined that at least one landing door switch in the elevator safety chain has a possibility of failure.

8. The device according to claim 1, wherein the interface unit includes an AC-DC conversion circuit configured to convert an AC signal transmitted on the elevator safety chain into the operating signal having the first level.

9. The device according to claim 1, wherein the interface unit includes a DC-DC conversion circuit configured to convert a DC signal transmitted on the elevator safety chain into the operating signal having the first level.

10. The device according to claim 1, wherein the device is an elevator controller.

11. The device according to claim 1, wherein the running of the computer program causes an evaluation result on the reliability of the elevator safety chain to be output.

12. A method for detecting a status of an elevator safety chain, the method comprising:

A. generating a corresponding operating signal based on a state of the elevator safety chain, wherein the operating signal has a first level when the elevator safety chain is in an ON state, and the operating signal has a second level when the elevator safety chain is in an OFF state; and B. evaluating reliability of the elevator safety chain based on time domain characteristic of the generated operating signal;

wherein step B comprises:

B1. determining a number of times the amplitude of the operating signal changes within a time window, wherein the time window starts at the time when the amplitude of the operating signal jumps from the first level to the second level or from the second level to the first level;

B2. in response to the number of changes within the time window being greater than a predetermined first threshold, determining that at least one landing door switch in the elevator safety chain has possibility of failure.

13. The method according to claim 12, wherein the time domain characteristic includes the characteristic that an amplitude of the operating signal changes with time.

14. The method according to claim 12, wherein width of the time window is determined based on operation parameters of a landing door.

15. The method according to claim 14, wherein the width is determined to be substantially equal to a predetermined duration that the landing door remains open when no passengers are entering an elevator car or a predicted duration that the landing door remains open when a passenger is entering the elevator car.

16. The method according to claim 13, wherein step B comprises:

B1'. determining a duration for which the amplitude of the operating signal is maintained at the first level or the second level;

B2'. if the duration is less than a predetermined second threshold, it is determined that at least one landing door switch in the elevator safety chain has possibility of failure.

17. The method according to claim 16, wherein the second threshold is determined to be substantially equal to a predetermined duration that the landing door remains open when no passengers are entering an elevator car or a predicted duration that the landing door remains open when a passenger is entering the elevator car.

18. The method according to claim 13, wherein step B comprises:

B1". determining a rate of change of the amplitude of the operating signal jumping from the first level to the second level or jumping from the second level to the first level;

B2". if the rate of change deviates from a predetermined range, it is determined that at least one landing door switch in the elevator safety chain has possibility of failure.

19. The method according to claim 12, further comprising:

C. outputting an evaluation result on the reliability of the elevator safety chain.

20. A non-transitory computer-readable storage medium having instructions stored in the non-transitory computer-readable storage medium, wherein when the instructions are executed by a processor, the processor is caused to execute the method of claim 12.

* * * * *